No. 654,020. Patented July 17, 1900.
I. E. QUIST.
ADJUSTABLE ECCENTRIC OR GEAR.
(Application filed May 10, 1900.)
(No Model.)

Witnesses
Inventor
Irving E. Quist
by
Attorneys

UNITED STATES PATENT OFFICE.

IRVING E. QUIST, OF ATWATER, MINNESOTA.

ADJUSTABLE ECCENTRIC OR GEAR.

SPECIFICATION forming part of Letters Patent No. 654,020, dated July 17, 1900.

Application filed May 10, 1900. Serial No. 16,164. (No model.)

*To all whom it may concern:*

Be it known that I, IRVING E. QUIST, a citizen of the United States, residing at Atwater, in the county of Kandiyohi and State of Minnesota, have invented certain new and useful Improvements in Adjustable Eccentrics or Gears; and I do declare the following to be a full, clear, and exact description of the invention, such as will enable others skilled in the art to which it appertains to make and use the same.

The invention relates to an adjustable eccentric or gear; and the object is to provide simple, durable, and inexpensive means for radially adjustably connecting the drive or driven shaft to the drive or driven gear.

With this object in view the invention consists in certain features of construction and combination of parts, which will be hereinafter fully set forth.

Figure 1:
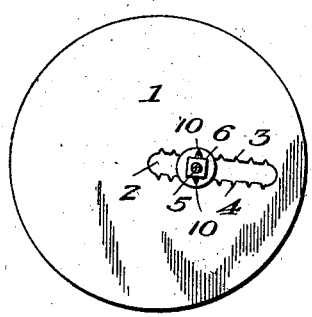
Figure 2:
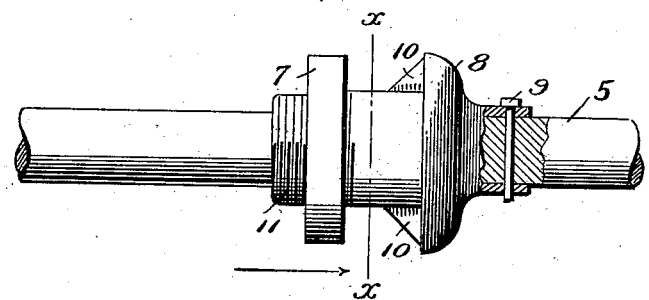
Figure 3:
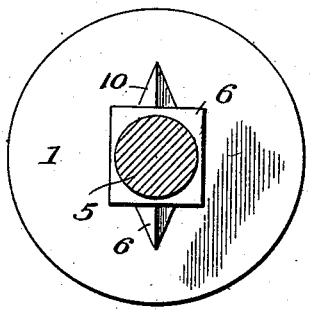

In the accompanying drawings, Figure 1 is a side elevation of a gear, illustrating the application of my invention. Fig. 2 is a longitudinal view of the shaft and the clamping-jaws, and Fig. 3 is a cross-sectional view on line $x\,x$ of Fig. 2 looking in the direction of the arrow.

Referring to the drawings, 1 denotes a gear-wheel eccentric or cam having extending from its axis a radial slot or aperture 2, provided on its edges with inclined upper and lower notches 3 and 4, the notches of one set being alined with the notches of the opposite set.

5 denotes the drive or driven shaft, the portion 6 of which is of a diameter corresponding to the distance between the walls of the slot or aperture 2.

7 and 8 denote clamping-jaws, one of which is fixedly secured by a pin or key 9 to the shaft and is provided with wings or fins 10, which fit the notches 3 and 4 and hold the shaft to the gear or cam 1 against rotation. The jaw 7 is in the form of a nut and screws upon a screw-threaded shoulder 11 of the shaft and prevents endwise movement of the shaft with respect to the part 1.

When the part 1 is clamped between the jaws, it will be impossible for it to work longitudinally of the shaft or rotate independently of the shaft. When it is desired to adjust the shaft and the gear with respect to each other, the jaw 7 is loosened, thus permitting the gear or shaft to be moved one with respect to the other to withdraw the wings or fins 10 from the notches 3 and 4 of the slot or aperture, and after the shaft or gear has been adjusted the desired distance toward or from the axis of the part 1 the wings or fins 10 are engaged with the notches 3 and 4 and are clamped into position by screwing up the jaw 7.

From the foregoing description, taken in connection with the accompanying drawings, the construction, operation, and advantages of my improved adjustable eccentric or gear will be readily apparent without requiring an extended explanation. It will be seen that the device is simple of construction, that said construction permits of its manufacture at small cost, and that it is exceedingly-well adapted for the purpose for which it is designed.

Various changes in the form, proportion, and the minor details of construction may be resorted to without departing from the principle or sacrificing any of the advantages of this invention.

Having thus fully described my invention, what is claimed as new, and desired to be secured by Letters Patent, is—

The combination with the part 1, which may be in the form of a gear, eccentric, or cam and which is provided with a radial slot formed with notches, of a shaft extending through said slot and a clamp on said shaft provided with wings or fins to engage said notches, and means for clamping said wings or fins in said notches, substantially as set forth.

In testimony whereof I have hereunto set my hand in presence of two subscribing witnesses.

IRVING E. QUIST.

Witnesses:
H. L. QUIST,
W. H. QUIST.